(12) United States Patent
Xiong

(10) Patent No.: US 10,018,895 B2
(45) Date of Patent: Jul. 10, 2018

(54) PROJECTOR, PROJECTOR MONITORING SYSTEM, AND PROJECTOR MONITORING METHOD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Na Xiong, Wuhan (CN)

(73) Assignees: HONG FU JIN PRECISION INDUSTRY (WuHan) CO., I, Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/386,463

(22) Filed: Dec. 21, 2016

(65) Prior Publication Data

US 2018/0004073 A1    Jan. 4, 2018

(30) Foreign Application Priority Data

Jun. 30, 2016   (CN) .......................... 2016 1 050 1633

(51) Int. Cl.
*G03B 21/14*   (2006.01)
*G03B 21/16*   (2006.01)

(52) U.S. Cl.
CPC .............. *G03B 21/14* (2013.01); *G03B 21/16* (2013.01); *G03B 2206/00* (2013.01)

(58) Field of Classification Search
CPC ................ G03B 21/16; G03B 21/2053; G03B 21/2086; H04N 9/3144; H04N 9/3155; H04N 9/3194
See application file for complete search history.

(56) References Cited

U.S. PATENT DOCUMENTS

| 9,250,503 B2 * | 2/2016 | Tani ........................ G03B 21/14 |
| 2009/0040468 A1 * | 2/2009 | Kameoka ........... G03B 21/2086 353/52 |

* cited by examiner

*Primary Examiner* — Sultan Chowdhury
(74) *Attorney, Agent, or Firm* — ScienBiziP, P.C.

(57) ABSTRACT

A projector or group of projectors each includes a data acquisition module, a first storage, a first determining module, and a first communicating module. The data acquisition module acquires present working values of working portions of the projector. The first storage stores working parameters comprising fixed normal values when the projector and all its parts is in normal working state. The first determining module can determine whether a reading showing the present working value is consistent with fixed normal parametric value. The first communicating module communicates with a monitoring terminal, and when the present working value is not consistent with the fixed normal value, the present working value of the working parameter is transmitted to a monitoring terminal. A projector monitoring system and method are also disclosed.

18 Claims, 5 Drawing Sheets

PROJECTOR, PROJECTOR MONITORING SYSTEM, AND PROJECTOR MONITORING METHOD

CROSS-REFERENCE TO RELATED APPLICATIONS

This application claims priority to Chinese Patent Application No. 201610501633.X, filed on Jun. 30, 2016, the contents of which are incorporated by reference herein.

FIELD

The subject matter herein generally relates to projectors, and especially relates to a projector monitoring system and method.

BACKGROUND

Projectors are used in schools and meeting rooms. When the projector is worn out or damaged, a maintenance person checks each portion of the projector to find malfunctioned portions of the projector. Some portions of the projector cannot be repaired. A new portion or a new projector may be required to replace the worn out or damaged portion.

BRIEF DESCRIPTION OF THE DRAWINGS

Implementations of the present technology will now be described, by way of example only, with reference to the attached figures.

DETAILED DESCRIPTION

Figure 1:
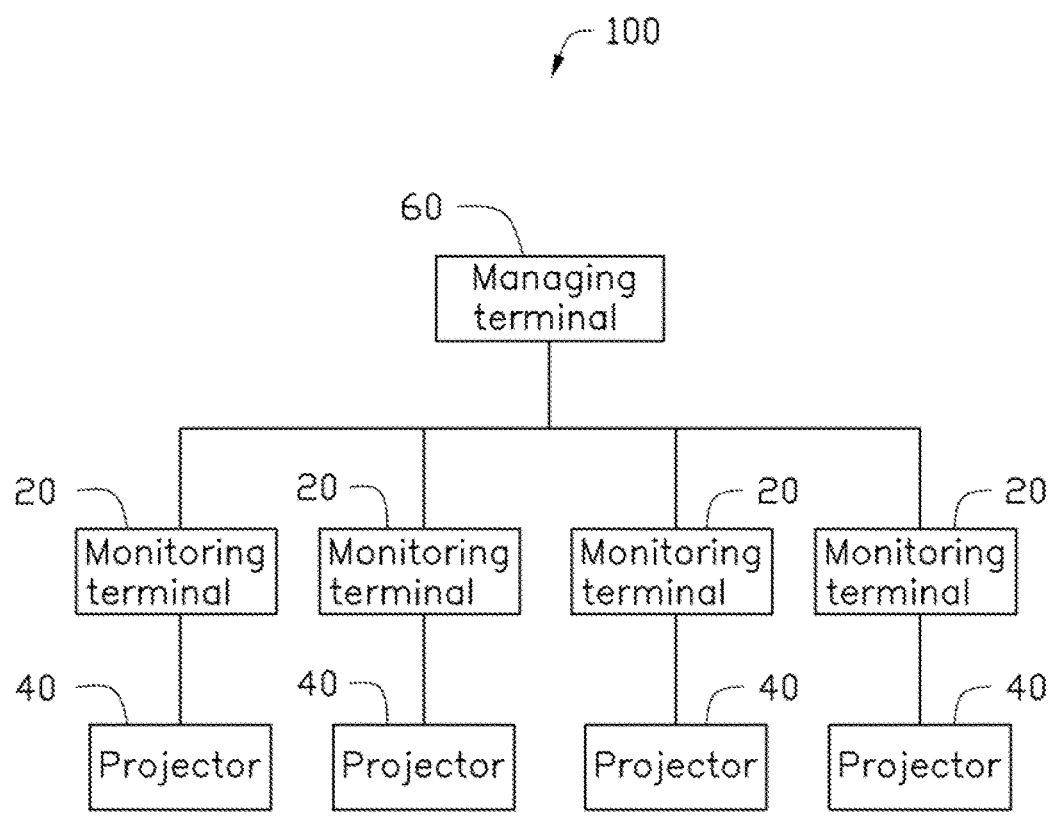
FIG. 1 is a schematic view of a projector monitoring system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

A definition that applies throughout this disclosure will now be presented.

The term "comprising" means "including, but not necessarily limited to"; it specifically indicates open-ended inclusion or membership in a so-described combination, group, series, and the like.

FIG. 1 illustrates a projector monitoring system 100. The projector monitoring system 100 includes a number of monitoring terminals 20, a number of projectors 40, and a managing terminal 60. The managing terminal 60 communicates with the monitoring terminals 20. The projectors 40 each have a monitoring terminal 20. The projector 40 communicates with the monitoring terminal 20 by WIFI. The monitoring terminal 20 monitors a working state of the projector 40 to determine whether the projector 40 is in a normal working state or otherwise and transmits working information to the managing terminal 60 in real time. The monitoring terminal 20 can be a computer. Thus, a manager can know the working information of each projector 40 through the managing terminal 60. According to the working information of the projector 40, the manager can take preventative action in relation to the projector 40.

Figure 2:
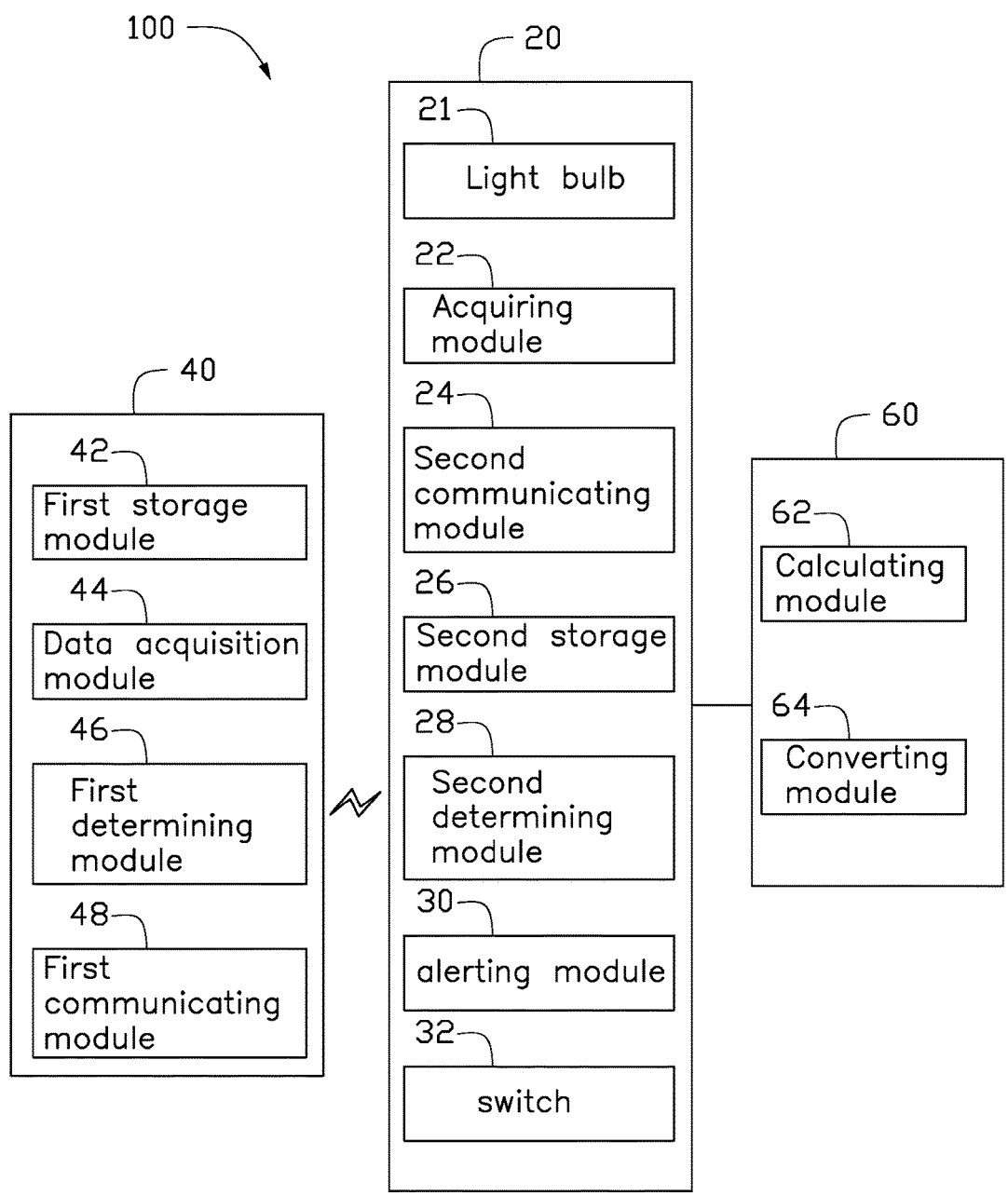
FIG. 2 is a block diagram of the projector monitoring system in FIG. 1.

FIG. 2 illustrates that each projector 40 including a first storage module 42, a data acquisition module 44, a first determining module 46, and a first communicating module 48. The projector 40 further includes a controller (not shown) for executing programs associated with the data acquisition module, the first storage module, the first determining module, and the first communicating module. The data acquisition module 44 acquires readings as to present working values of the projector 40, for example, a working time of a light bulb of the projector 40 and a voltage value of a fan of the projector 40. The first storage 42 stores portions of the projector 40, which have fixed normal values when the projector 40 is in normal working state. For example, the fixed normal voltage value of the fan is 12V. According to such fixed normal value and the present working value, both values being for the same portion of the projector, the first determining module 46 determines whether the present working value is consistent with the fixed normal value. When the present working value is not consistent with the fixed normal value, the first communicating module 48 transmits the present working value to the monitoring terminal 20. Thus, when the working state of the projector 40 is abnormal, the manager can timely receive useful information about the projector 40.

Each monitoring terminal 20 includes an acquiring module 22, a second communicating module 24, a second storage module 26, a second determining module 28, and an alerting module 30. The second storage module 26 stores a normal working value of each portion of the projector 40. The acquiring module 22 transmits an acquiring signal to the projector 40. According to the acquiring signal, the first communicating module 48 transmits the present working value of each portion of the projector 40 to the monitoring terminal 20. The second communicating module 24 receives the present working values. The second determining module 28 determines whether the projector 40 or a portion of it is in abnormal state. The abnormal present working value of the projector 40 is sent out by the alerting module 30 in the form of an alert. The alert may be voice or text.

Each monitoring terminal 20 further includes a switch 32. The switch 32 can control the monitoring terminal 20 to turn on or off. In response to a on or off operation on the switch 32, the switch 32 further sends a on or off signal of the projector 40. The second communicating module 24 transmits the on or off signal to the projector 40. According to the on or off signal, the projector 40 is turned on or off.

When the projector 40 is in the abnormal state, the second communicating module 24 further transmits the abnormal present working value to the managing terminal 60. The managing terminal 60 includes a calculating module 62 and a converting module 64. The calculating module 62 calculates a number of counts of each portion of each projector 40 that is found to be in an abnormal state. According to the number of counts of each projector 40, the converting module 64 generates a first two-dimensional graphic of the number of counts. Thus, the manager can know which portion of each projector 40 has the greatest number of abnormalities and frequency thereof and can take action. The converting module 64 further generates a second two-dimensional graphic of the number of counts of an abnormal state of all the projectors 40. Thus, the manager can know which projector 40 has the most abnormalities out of all the projectors 40.

Figure 3:
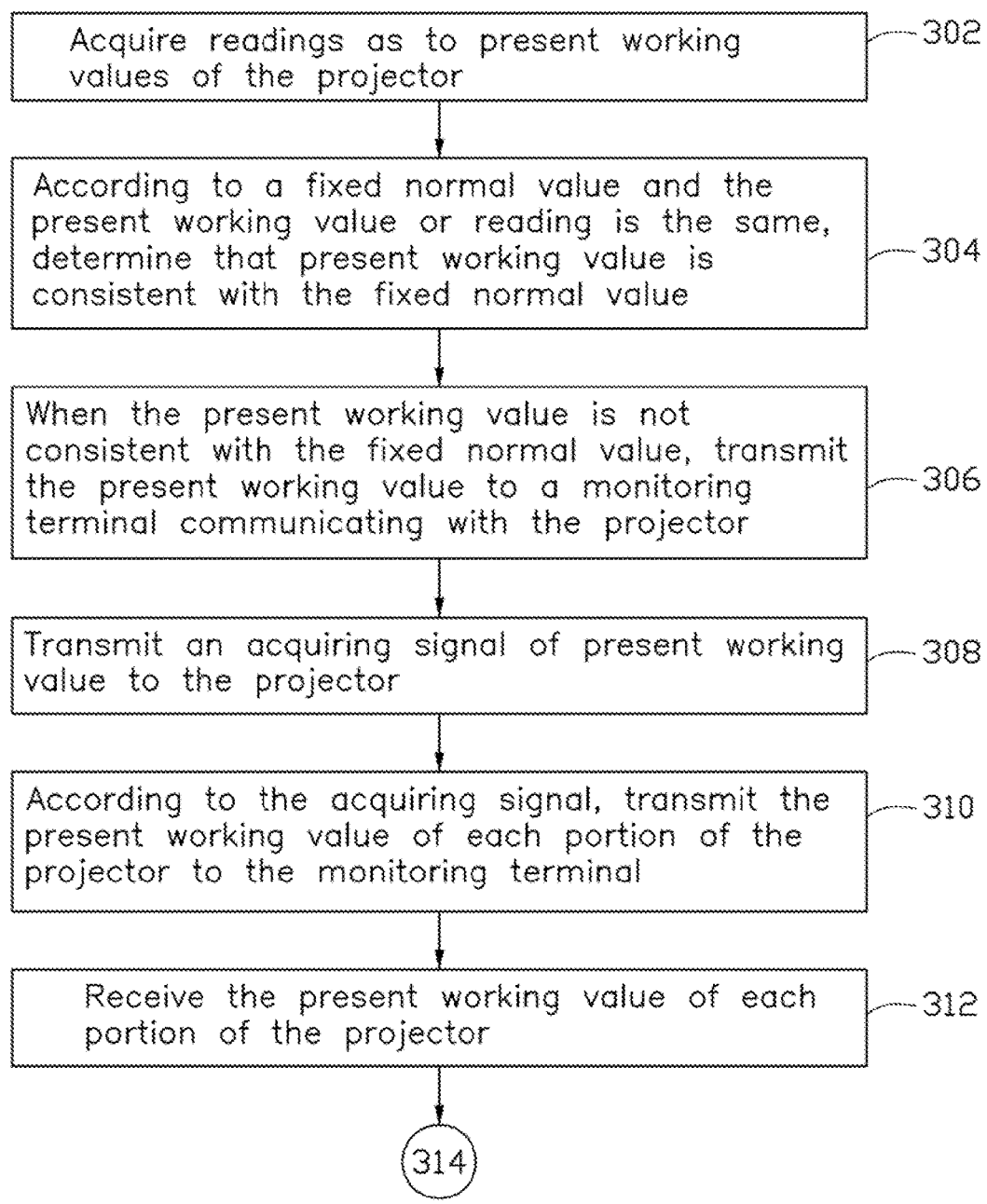
FIGS. 3-4 are flowcharts of a projector monitoring method according to an exemplary embodiment.
Figure 4:
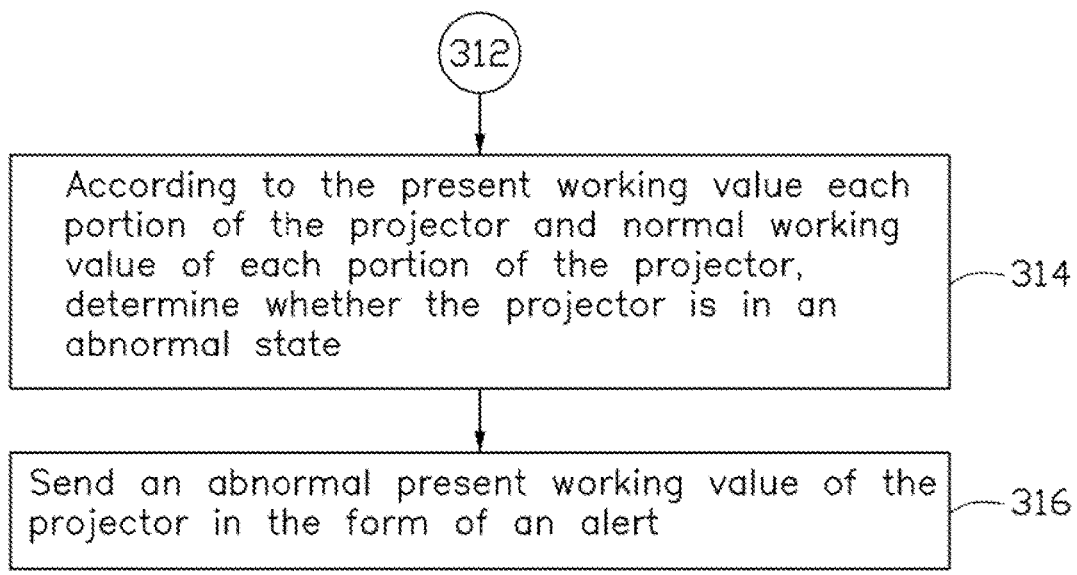
Figure 5:
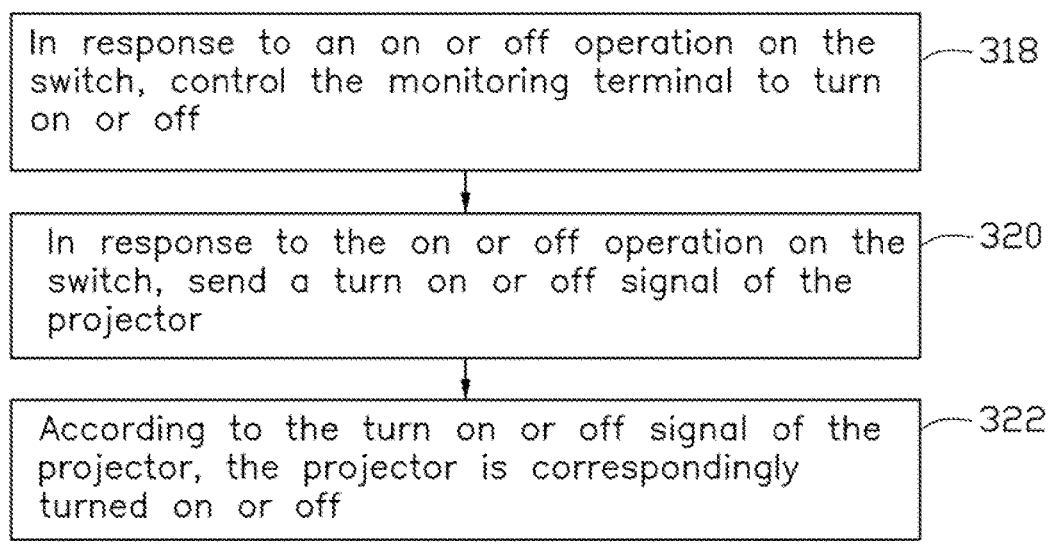
FIG. 5 is a flowchart of the projector monitoring method according to another exemplary embodiment.

FIGS. 3-4 illustrate a projector monitoring method according to an exemplary embodiment. The order of blocks in FIG. 3 is illustrative only and the order of the blocks can change. Additional blocks can be added or fewer blocks may be utilized without departing from this disclosure. The exemplary method begins at block 302.

At block 302, the data acquisition module 44 acquires readings as to present working values of portions of the projector 40.

At block 304, according to fixed normal values and the present working values both values being for the same portion of the projector, the first determining module 46 determines whether the present working value is consistent with the fixed normal value.

At block 306, when the present working value is not consistent with the fixed normal value, the first communicating module 48 transmits the present working value to a monitoring terminal 20 in communication with the projector 40.

At block 308, the acquiring module 22 transmits an acquiring signal of the present working value to the projector 40.

At block 310, according to the acquiring signal, the first communicating module 48 transmits the present working value of each portion of the projector 40 to the monitoring terminal 20.

At block 312, the second communicating module 24 receives the present working value of each portion of the projector 40.

At block 314, according to the present working value of each portion of the projector 40 and the normal working value of each portion of the projector 40, the second determining module 28 determines whether the projector 40 is in an abnormal state.

At block 316, the alerting module 30 sends an abnormal present working value of the projector 40 in the form of an alert.

Referring to FIG. 4, in another exemplary embodiment, the projector monitoring method further includes following blocks 318-322.

At block 318, in response to an on or off operation on the switch 32, the switch 32 controls the monitoring terminal 20 to turn on or off.

At block 320, in response to the on or off operation on the switch 32, the switch 32 further sends a turn on or off signal of the projector 40.

At block 322, according to the turn on or off signal of the projector 40, the projector 40 is correspondingly turned on or off.

The exemplary embodiments shown and described above are only examples. Even though numerous dataistics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A projector comprising:
   a data acquisition module configured to acquire readings as to present working values of the projector;
      a first storage module configured to store portions of the projector, and the portions of the projector having fixed normal values when the projector is in a normal working state;
      a first determining module configured to determine whether the present working values being consistent with the fixed normal values according to each fixed normal value and each present working value both values being for the same portion of the projector;
      a first communicating module configured to communicate with a monitoring terminal, and wherein when the present working value is not consistent with the fixed normal value, the first communication module transmits the present working value to the monitoring terminal; wherein the monitoring terminal is a computer; and
   at least one controller for executing programs associated with at least one of the data acquisition module, the first storage module, the first determining module, and the first communicating module.

2. The projector as claimed in claim 1, wherein the present working value comprises a voltage value of a fan of the projector.

3. A projector monitoring system comprising:
   at least one monitoring terminal; wherein the monitoring terminal is a computer; and
   at least one projector, the projector having at least one monitoring terminal;
   each projector comprising:
      a data acquisition module configured to acquire readings as to present working values of the projector;
      a first storage module configured to store portions of the projector, and the portions of the projector which having fixed normal values when the projector is in normal working state;
      a first determining module configured to determine whether the present working values being consistent with the fixed normal values according to each fixed normal value and each present working value both values being for the same portion of the projector;
      a first communicating module configured to communicate with the monitoring terminal, wherein when the present working value is not consistent with the fixed normal value, the first communicating module transmits the present working value to corresponding monitoring terminal;
   at least one controller for executing programs associated with at least one of the data acquisition module, the first storage module, the first determining module, and the first communicating module.

4. The projector monitoring system as claimed in claim 3, wherein each monitoring terminal comprises an acquiring module and a second communicating module, the acquiring module transmits an acquiring signal of the present working value to the projector, according to the acquiring signal, the first communicating module transmits the present working value of each portion of the projector to the monitoring terminal, the second communicating module receives the present working value of each portion to the projector.

5. The projector monitoring system as claimed in claim 4, wherein the projector monitoring system further comprises a second storage module and a second determining module, the second storage module stores a normal working value of each portion of the projector, according to the present working value of each portion of the projector and the normal working value of each portion of the projector, the second determining module determines whether the projector is in abnormal state.

6. The projector monitoring system as claimed in claim 5, wherein the projector monitoring system further comprises an alerting module, an abnormal present working value of the projector is sent out by the alerting module in the form of an alert.

7. The projector monitoring system as claimed in claim 6, wherein the alert is in the form of a sound or voice.

8. The projector monitoring system as claimed in claim 6, wherein the alert is in the form of a text.

9. The projector monitoring system as claimed in claim 3, wherein each monitoring terminal comprises a switch, in response to an on or off operation on the switch, the switch further sends a on or off signal of the projector, and depending on the on or off signal, the projector is correspondingly turned on or off.

10. The projector monitoring system as claimed in claim 3, wherein the projector monitoring system comprises a plurality of projectors, a plurality of monitoring terminals, and a managing terminal, the managing terminal communicates with the monitoring terminals, the monitoring terminal transmits the present working value to the managing terminal.

11. The projector monitoring system as claimed in claim 10, wherein the managing terminal comprises a calculating module, the calculating module calculates a number of counts of each portion of each projector found to be in abnormal state according to the present working value.

12. The projector monitoring system as claimed in claim 11, wherein the managing terminal comprises a converting module, according to the number of counts of each projector, the converting module generates a first two-dimensional graphic of the number counts of abnormal state of each projector.

13. The projector monitoring system as claimed in claim 12, wherein the converting module further generates a second two-dimensional graphic of the number of counts of abnormal state of all the projectors.

14. A projector monitoring method executed in a controller of a projector comprising:
   acquiring readings as to present working values of portions of the projector;
   according to portions of the projector which have fixed normal values stored in the projector and the present working values, determining whether present working value is consistent with the fixed normal value;
   when the present working value not being consistent with the fixed normal value which has a value being for the same portion of the projector to the present working value, transmitting the present working value to a monitoring terminal in communication with the projector.

15. The method as claimed in claim 14, further comprising:
   transmitting an acquiring signal of the present working value to the projector; and
   according to the acquiring signal, transmitting the present working value of each portion of the projector to the monitoring terminal.

16. The method as claimed in claim 15, further comprising:
   according to the present working value of each portion of the projector and normal working value of each portion of the projector stored in the monitoring terminal, determining whether the projector being in an abnormal state.

17. The method as claimed in claim 16, wherein comprising:
   sending an abnormal present working value of the projector in the form of an alert.

18. The method as claimed in claim 16, wherein comprising:
   in response to an on or off operation on a switch, controlling the monitoring terminal to turn on or off;
   in response to the on or off operation on the switch, sending a on or off signal of the projector; and
   according to the on or off signal, the projector is correspondingly turned on or off.

* * * * *